United States Patent
Demonte

(10) Patent No.: US 11,794,656 B2
(45) Date of Patent: Oct. 24, 2023

(54) PORTABLE STAIR STRUCTURE FOR VEHICLE, STAIR STRUCTURE KIT, AND METHODS OF USING SAME

(71) Applicant: Walter Peter Demonte, Maidstone (CA)

(72) Inventor: Walter Peter Demonte, Maidstone (CA)

( * ) Notice: Subject to any disclaimer, the term of this patent is extended or adjusted under 35 U.S.C. 154(b) by 105 days.

(21) Appl. No.: 17/370,583

(22) Filed: Jul. 8, 2021

(65) Prior Publication Data

US 2022/0009418 A1 Jan. 13, 2022

Related U.S. Application Data

(60) Provisional application No. 63/049,669, filed on Jul. 9, 2020.

(51) Int. Cl.
*B60R 3/02* (2006.01)

(52) U.S. Cl.
CPC ...................... *B60R 3/02* (2013.01)

(58) Field of Classification Search
CPC ........................................ B60R 3/02
See application file for complete search history.

(56) References Cited

U.S. PATENT DOCUMENTS

| | | |
|---|---|---|
| 1,118,584 A | 11/1914 | Roebuck et al. |
| 2,246,986 A | 6/1941 | Pellegrini |
| 2,642,217 A | 6/1953 | Jennings |
| 2,670,968 A | 3/1954 | Duffy |
| 3,669,218 A * | 6/1972 | Hall .......................... E06C 9/00 296/62 |
| 3,833,240 A | 9/1974 | Weiler |
| 4,093,257 A | 6/1978 | Tarvin |
| 4,860,854 A | 8/1989 | Lodholz, Jr. |
| 5,312,150 A | 5/1994 | Quam |
| 7,025,174 B1 | 4/2006 | Hawley |
| 8,640,826 B1 * | 2/2014 | Beilstein ................. E06C 7/182 182/127 |
| 2007/0273123 A1 * | 11/2007 | Wilson ..................... B60R 3/02 280/166 |

* cited by examiner

*Primary Examiner* — Bryan A Evans
(74) *Attorney, Agent, or Firm* — Carrier, Shende & Associates P.C.; Joseph P. Carrier; Fulchand P. Shende

(57) ABSTRACT

A transportable personal elevation device is attachable to a substrate which is a vehicle or trailer bed. The elevation device includes a platform assembly including a platform and a platform support member. The elevation device also includes a connector assembly including a pivot pin and a mounting structure. The connector assembly is configured and arranged such that when attached to the substrate, the elevation device can be pivotally moved about the pivot pin between a storage position and an outwardly extending position. The elevation device may also include a latch assembly for temporarily fixing a position of the device, and may further include a post which is attached to a side of the platform assembly to permit grasping thereof by a user. The elevation device may take the form of a pivotable stair assembly which can be folded into a storage configuration and stored beneath a truck trailer.

6 Claims, 18 Drawing Sheets

FIG. 8
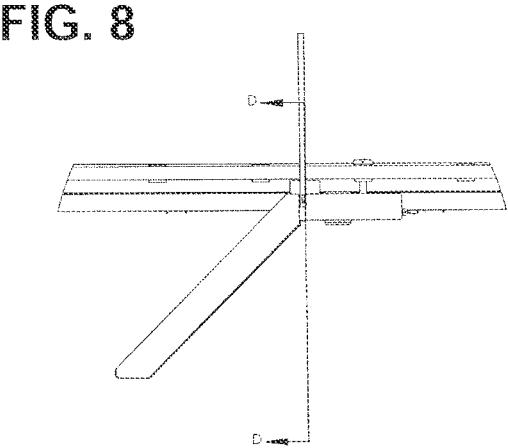
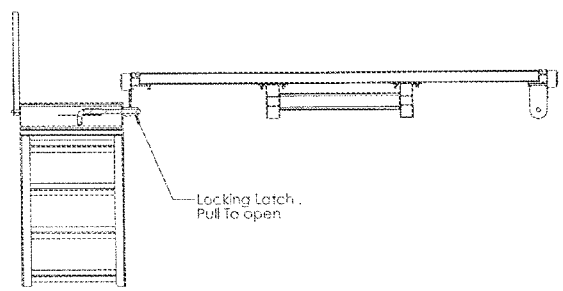
FIG. 9

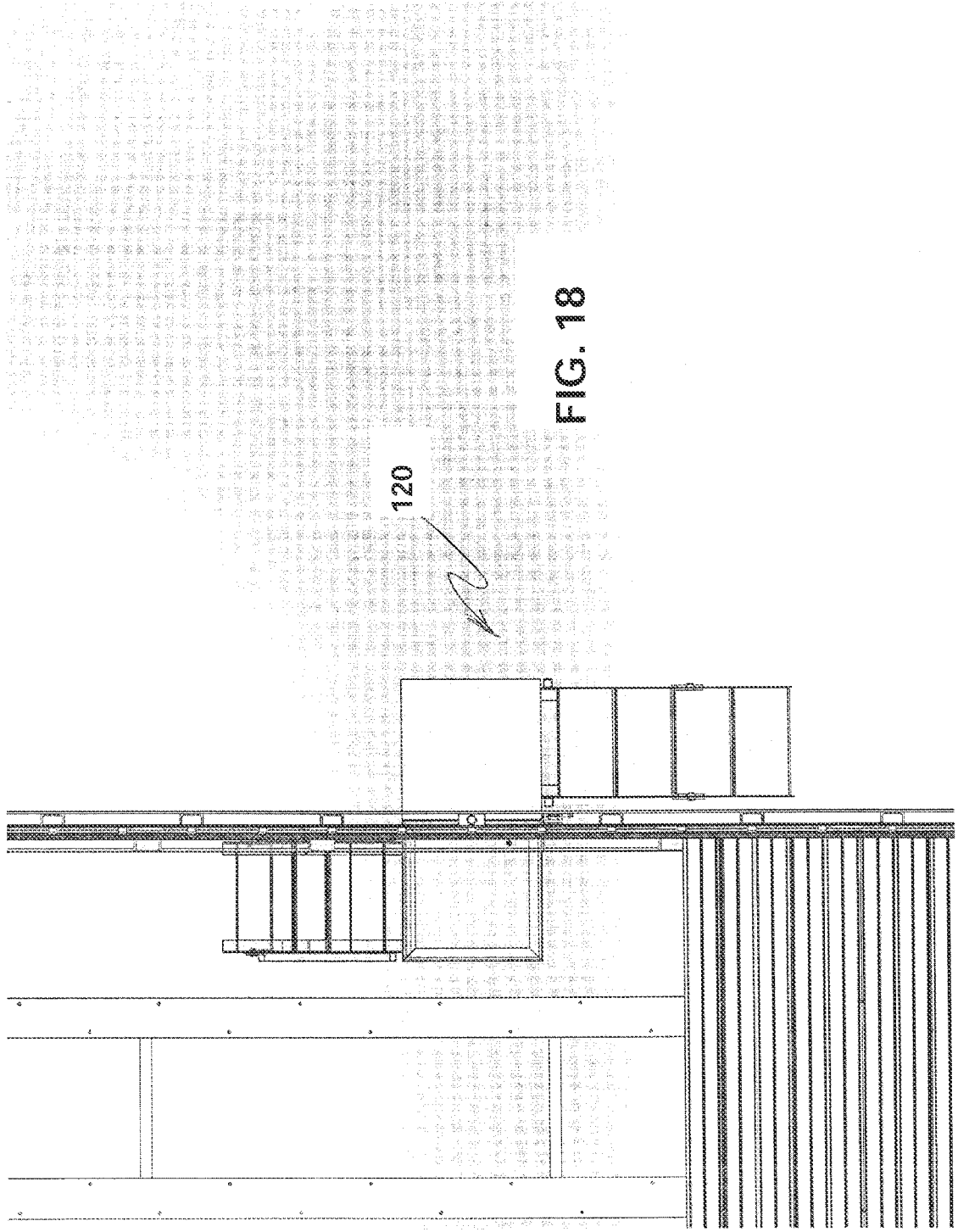

PORTABLE STAIR STRUCTURE FOR VEHICLE, STAIR STRUCTURE KIT, AND METHODS OF USING SAME

CROSS-REFERENCE TO RELATED APPLICATION

This application is based upon, and claims priority from U.S. Provisional Patent Application No. 63/049,669, filed Jul. 9, 2020. The entire contents of the referenced priority application are incorporated herein by reference.

BACKGROUND OF THE INVENTION

Field of the invention

The present invention relates to a transportable personal elevation device, for attaching to a vehicle or trailer, to an assembly kit for building such a transportable personal elevation device, and to methods of using the transportable personal elevation device. In one embodiment, the elevation device may take the form of a stowable stair structure.

More particularly, the present invention relates to a transportable personal elevation apparatus which is particularly suited to be used with an over-the-road semi trailer and which is configured to be permanently or semi-permanently attached to the trailer bed, where the apparatus enables a user to climb up on to a bed of the vehicle or trailer. The present invention also relates to related kits and methods.

Description of the Background Art

A number of different ladder and step assemblies are known for use with trucks and other vehicles. Examples of some of the known ladder and step assemblies include those described in U.S. Pat. Nos. 1,118,584, 2,246,986, 2,642,217, 2,670,968, 3,669,218, 3,833,240, 4,093,257, 4,860,854, 5,312,150, and U.S. Pat. No. 7,025,174.

Some truck drivers may have difficulty climbing up into the trailer of an over the road semi truck/trailer assembly, using known equipment provided at the back of the trailer, such as a small fixed ladder or the like. Such difficulty may be caused by age, disability or infirmity which may permit the driver to operate a truck, but which may impede or prevent climbing the known structures.

Although the known ladder and step assemblies are usable for their intended purposes, a need still exists in the art for a convenient transportable personal elevation device for a vehicle, and for method of using such an elevation device. In particular, there is a need for an improved transportable personal elevation device which is configured to be left in place on a truck trailer bed for an extended time period so as to be immediately usable when needed, to a kit which may be assembled to make such a transportable elevation device, and to a method of using such transportable elevation device.

SUMMARY OF THE INVENTION

Accordingly, it is an object of the present invention to provide a transportable personal elevation device which is configured to be left in place on a bed of a vehicle or trailer and which selectively enables a user to climb up on to a bed of the vehicle or trailer, a kit which may be used to construct such a personal elevation device, and to methods of using such kit and elevation device.

A transportable personal elevation device according to a first illustrative embodiment of the present invention is configured for attaching to movable substrate which is a vehicle or trailer bed. The elevation device includes a platform assembly including a platform and a platform support member supporting the platform thereon.

The elevation device according to the first embodiment also includes a connector assembly for operatively connecting the platform assembly to the bed, the connector assembly comprising a pivot pin and a mounting structure.

The connector assembly is configured and arranged such that when the personal elevation device is attached to the substrate, the personal elevation device can be pivotally moved about the pivot pin between a storage position and an outwardly extending position.

Optionally, the elevation device according to the first embodiment may also include a latch assembly for temporarily fixing a position of the device.

Optionally, the elevation device according to the first embodiment may also include a post which is attached to a side of the platform assembly, to permit grasping thereof by a user.

The connector assembly may be configured to attach the elevation device to a pocket at an edge portion of the vehicle or trailer bed.

A transportable personal elevation device according to another embodiment of the invention is provided for attaching to a bed of a vehicle or trailer, and takes the form of a stair structure including an upper platform and a connector assembly for connecting the stair structure to the bed. The connector assembly includes a pivot pin, which extends along a substantially vertical axis, and associated mounting structure including a mounting bracket.

A pair of spaced apart side support plates are attached to the platform and extend downwardly therefrom at an angle, and a plurality of spaced-apart step members extend between the side supports and are oriented substantially parallel to one another.

The connector assembly is configured and arranged such that when the stair structure is attached to the bed, it can be rotated about the pivot pin, between a stored position below the bed and a deployed position which extends outwardly from an edge of the bed. The stair structure is supported at two areas of support in each of the stored and deployed positions.

A latch assembly is provided for temporarily locking a position of the assembly in either the storage position or the deployed position.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 8 is a side plan view of the assembled stair structure and trailer bed, with the stair structure shown in the deployed position.

FIG. 9 is an end plan view of the assembled stair structure and trailer bed, with the stair structure shown in the deployed position.

FIG. 18 is a top plan view of the stair structure according to the second embodiment of the present invention, shown attached to the trailer bed and depicted in both the deployed and storage positions thereof.

DETAILED DESCRIPTION

It should be understood that only structures and methodology needed for illustrating selected embodiments of the present invention are described herein. Other conventional structures, and those of ancillary and auxiliary components of the system, will be known and understood by those skilled in the art.

First Embodiment

Figure 1:
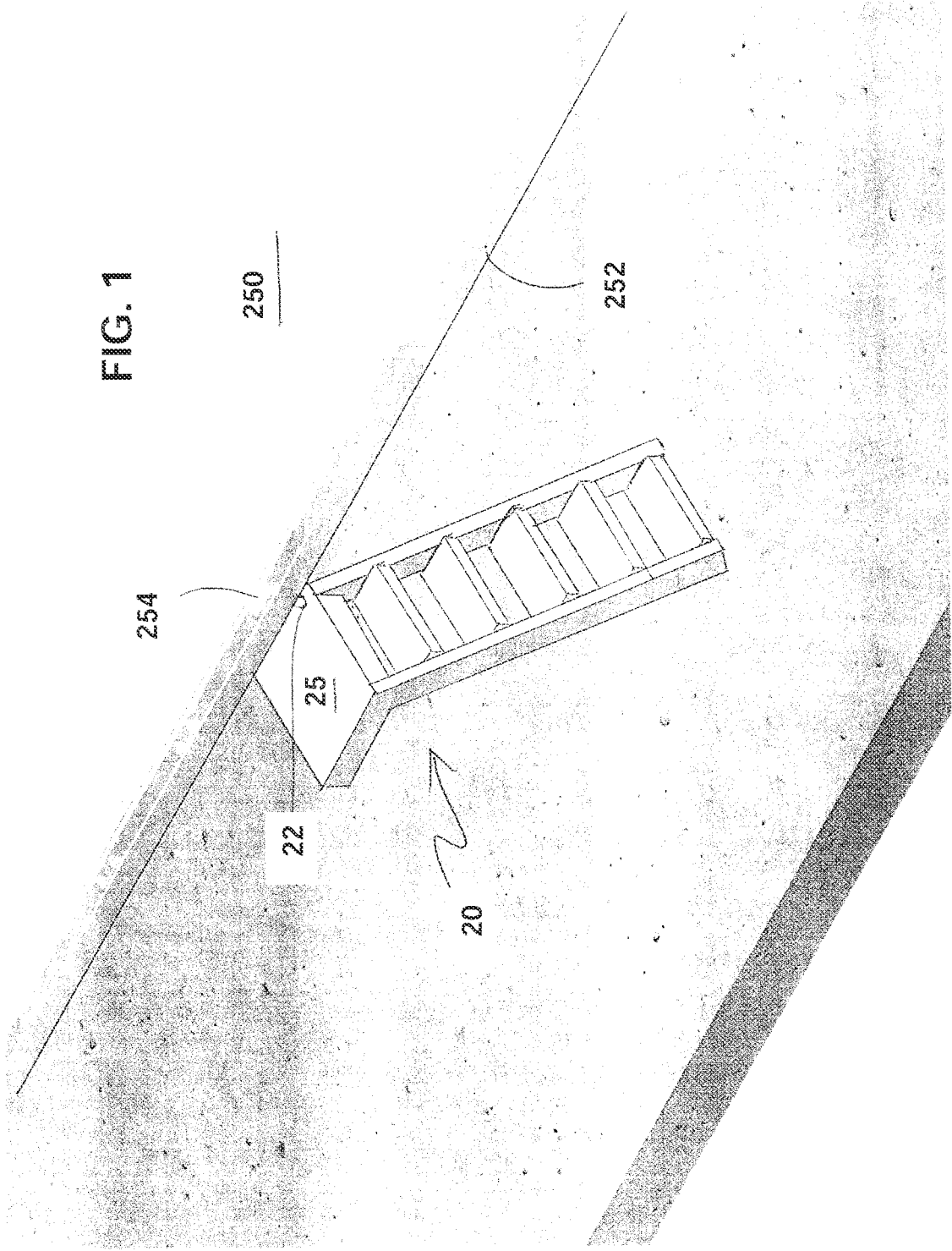
FIG. 1 is a first perspective view of a stair structure according to a first illustrative embodiment of the present invention, shown attached to a bed of a trailer and in a deployed position thereof.
Figure 2:
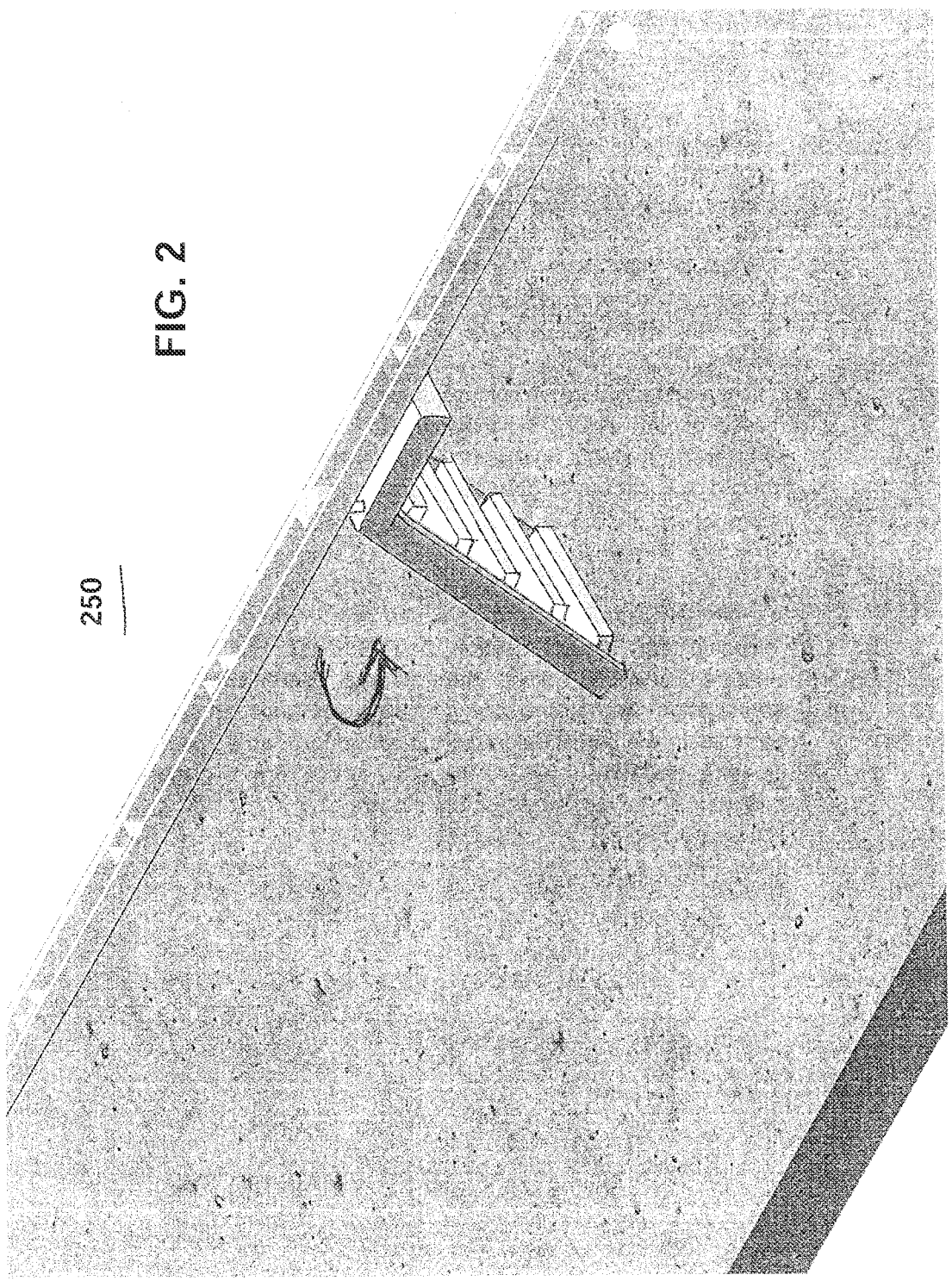
FIG. 2 is a second perspective view of the stair structure according to the first illustrative embodiment of the present invention, shown attached to the trailer bed and in a storage position thereof.

Referring initially to FIGS. 1 and 2 of the drawings, a transportable personal elevation device according to a first embodiment of the present invention takes the form of a stowable stair structure, which is shown generally at 20. The stowable stair structure 20 is provided for attaching to an underside of a bed 250 or other platform component of a vehicle or trailer.

It should be understood that, while the stair structure 20 is configured and arranged to be installable on, and used with a vehicle or trailer bed 250, the bed 250 is conventional, and does not form part of the present invention, per se. If desired, the stair structure 20 can be configured to be attached to other suitable areas of a vehicle or trailer.

When installed on the bed 250, the stair structure 20 is pivotally movable about a vertically oriented pivot pin 22, between a deployed position shown in FIG. 1 and a storage position shown in FIG. 2. In the storage position, the stair structure 20 is disposed under the bed 250, and in the deployed position, the stair structure extends outwardly and downwardly from an edge portion 252 of the bed.

Although the stair structure 20 is shown in FIG. 1 extending in a direction substantially parallel to the edge portion 252 of the bed 250 in the deployed position, it should be understood that the stair structure may be appropriately modified to make it extend in a direction substantially perpendicular to the edge portion of the bed in the deployed position, if desired.

Figure 3:
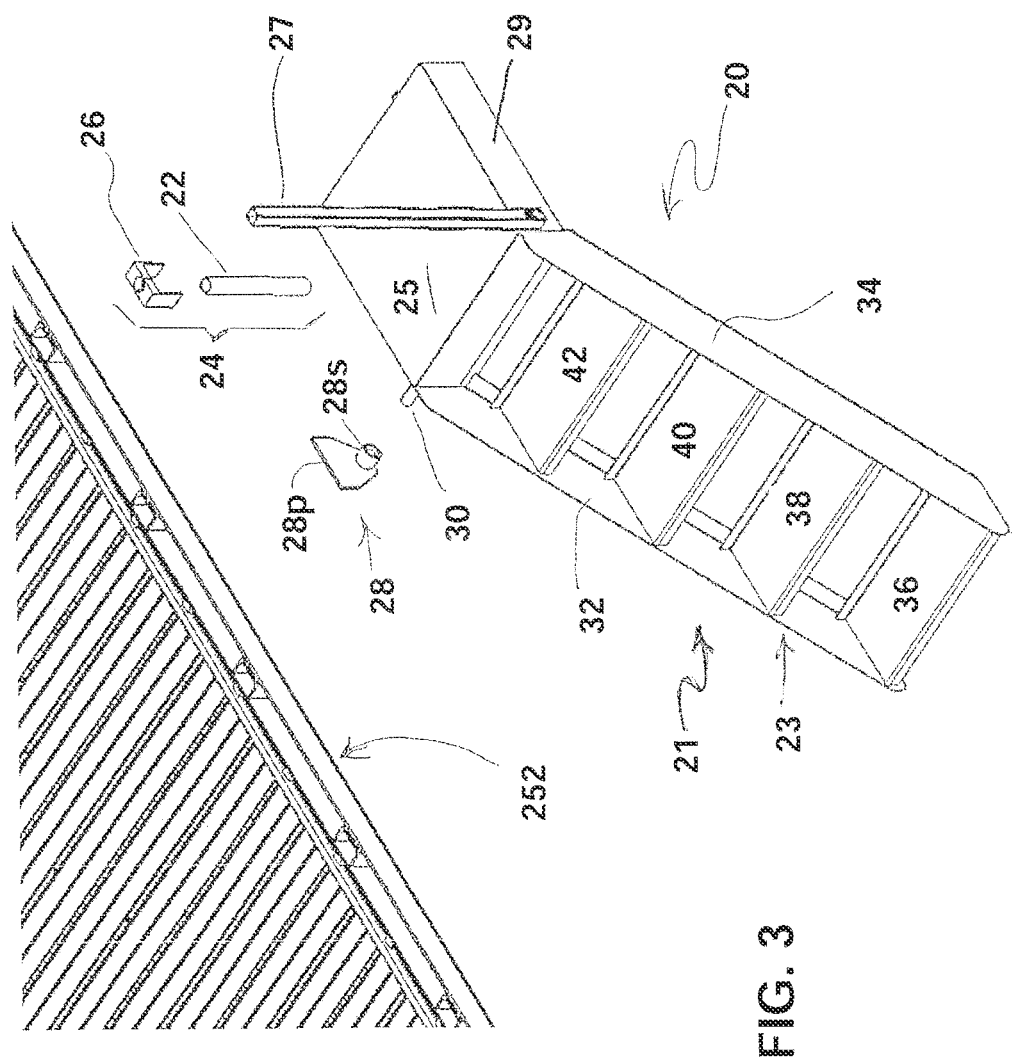
FIG. 3 is an exploded perspective view of the stair structure and trailer bed, with the stair structure shown in the deployed position.

The stair structure 20 is shown in an exploded perspective view in FIG. 3, in order to illustrate selected components thereof. The stair structure 20 is configured to be attached to the edge portion 252 of the bed 250 by a connector assembly 24, which includes the pivot pin 22 and associated mounting hardware, which may include a bracket 26 for attaching the pivot pin to a pocket 254 (FIG. 1) located at the edge of the bed. Such pockets are relatively well known and commonly provided on truck and trailer beds.

Alternatively, and as previously noted, the stair structure 20 may be configured to be attached to a different part of the vehicle or trailer, as needed.

The stair structure 20 includes a main stair body 21 which is attached to the bed 250 by the connector assembly 24. The main stair body 21 includes a ladder section 23 and an upper platform 25, which may be pivotally connected together. The ladder section 23 may be characterized as a platform support member.

As noted above, in this first embodiment, the pivot pin 22 extends along a substantially vertical axis in an installed configuration of the stair structure 20. The pivot pin 22 is shown separate from the platform 25 in the exploded view of FIG. 3 for illustrative purposes, but may be welded on to, or otherwise fixedly attached to an upper surface of the platform 25.

Alternatively, the pivot pin 22 may extend through a vertical hole formed in the platform 25, and the pivot pin may be configured to be fixed in place while the stair structure pivots around the pivot pin. Optionally, the pivot pin 22 may include a widened portion (not shown) at the lower end thereof, to better support the main stair body 21.

The platform 25 may have at least one handle or upright post 27 attached thereto, to permit grasping by a user while the user is climbing the stair structure 20. A separate post such as that shown at 27 may be used on each of the left and right sides of the platform 25. Optionally, such post(s) 27 may support a collapsible handrail (not shown). Where used, the post 27 is pivotally attached to a side edge portion of the platform 25, or to an upper portion of the ladder section 23, to allow movement of the post out of the way in preparation for pivotally moving the stair structure 20 from the deployed position to the storage position.

A socket member 28 may also be provided as part of the stair structure 20, and where used, the socket member may include a mounting plate 28p and a hollow cylindrical socket 28s affixed to the mounting plate and configured to receive a pin 30 attached to, and extending horizontally outwardly from another side edge portion of the platform 25, as shown.

Figure 7:
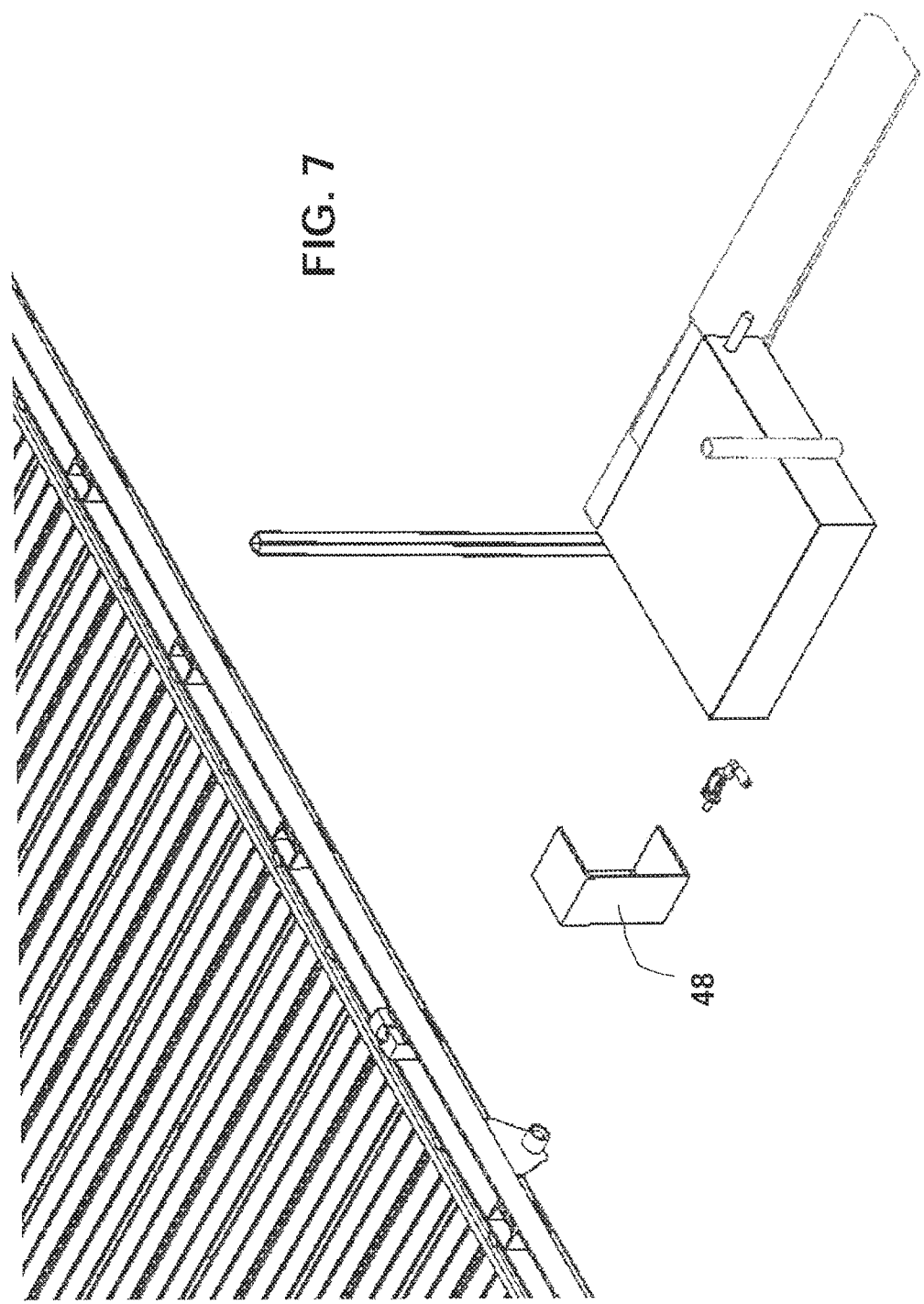
FIG. 7 is an exploded perspective view of the stair structure, associated hardware, and trailer bed from a vantage point above the stairs, with the stair structure shown in the deployed position.
Figure 10:
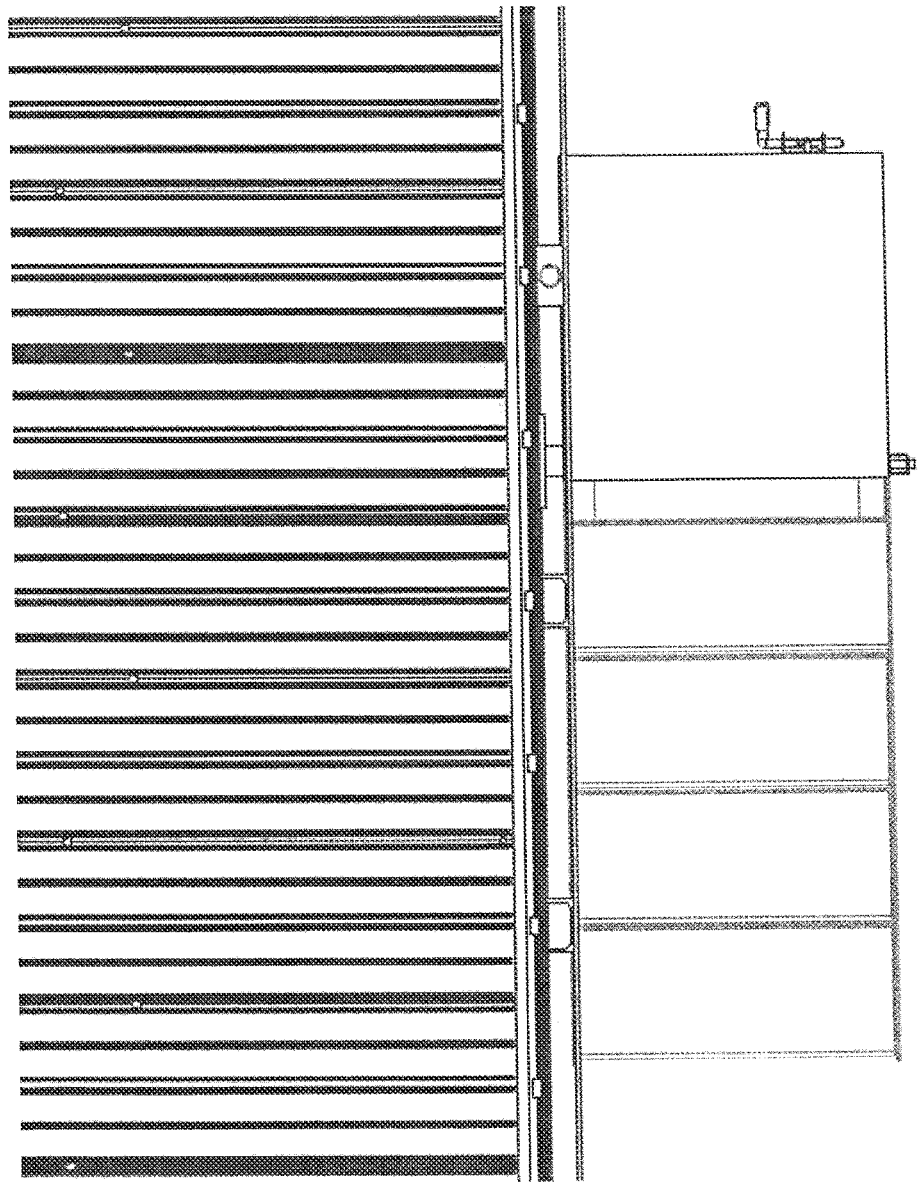
FIG. 10 is a top plan view of the assembled stair structure and trailer bed, with the stair structure shown in the deployed position.
Figure 11:
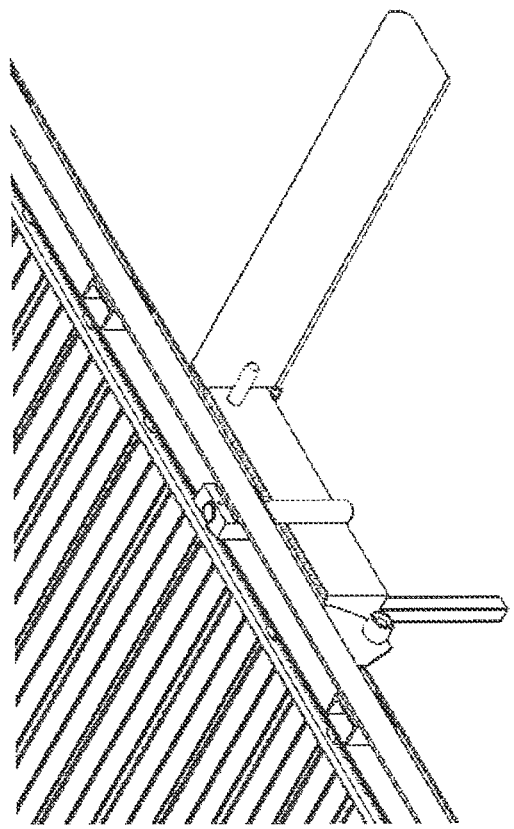
FIG. 11 is another perspective view of the stair structure and trailer bed from a vantage point above the stairs, showing the stair structure with the steps occluded and shown in the storage position.
Figure 12:
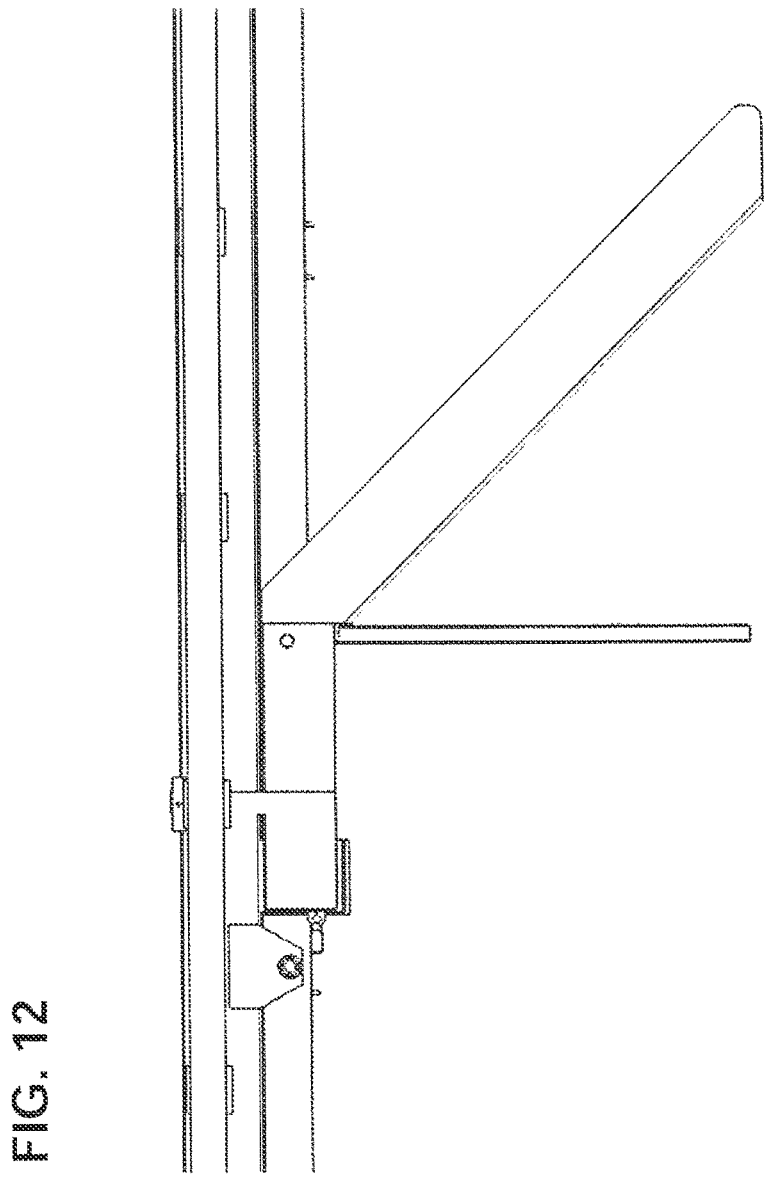
FIG. 12 is a side plan view of the assembled stair structure and trailer bed, with the stair structure shown in the storage position.
Figure 13:
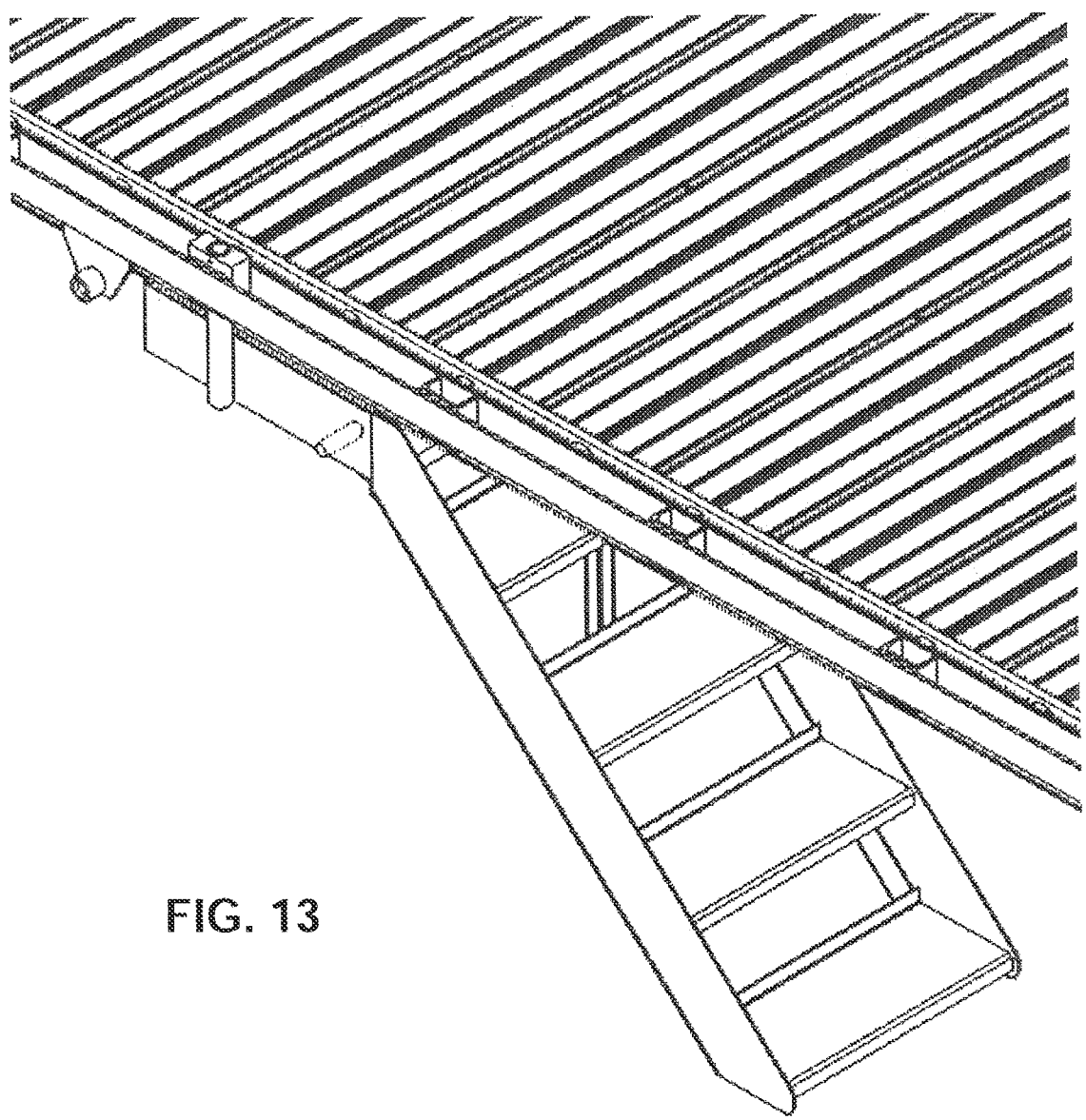
FIG. 13 is another perspective view of the stair structure and trailer bed from a vantage point above the stairs, with the stair structure shown in the storage position.
Figure 14:
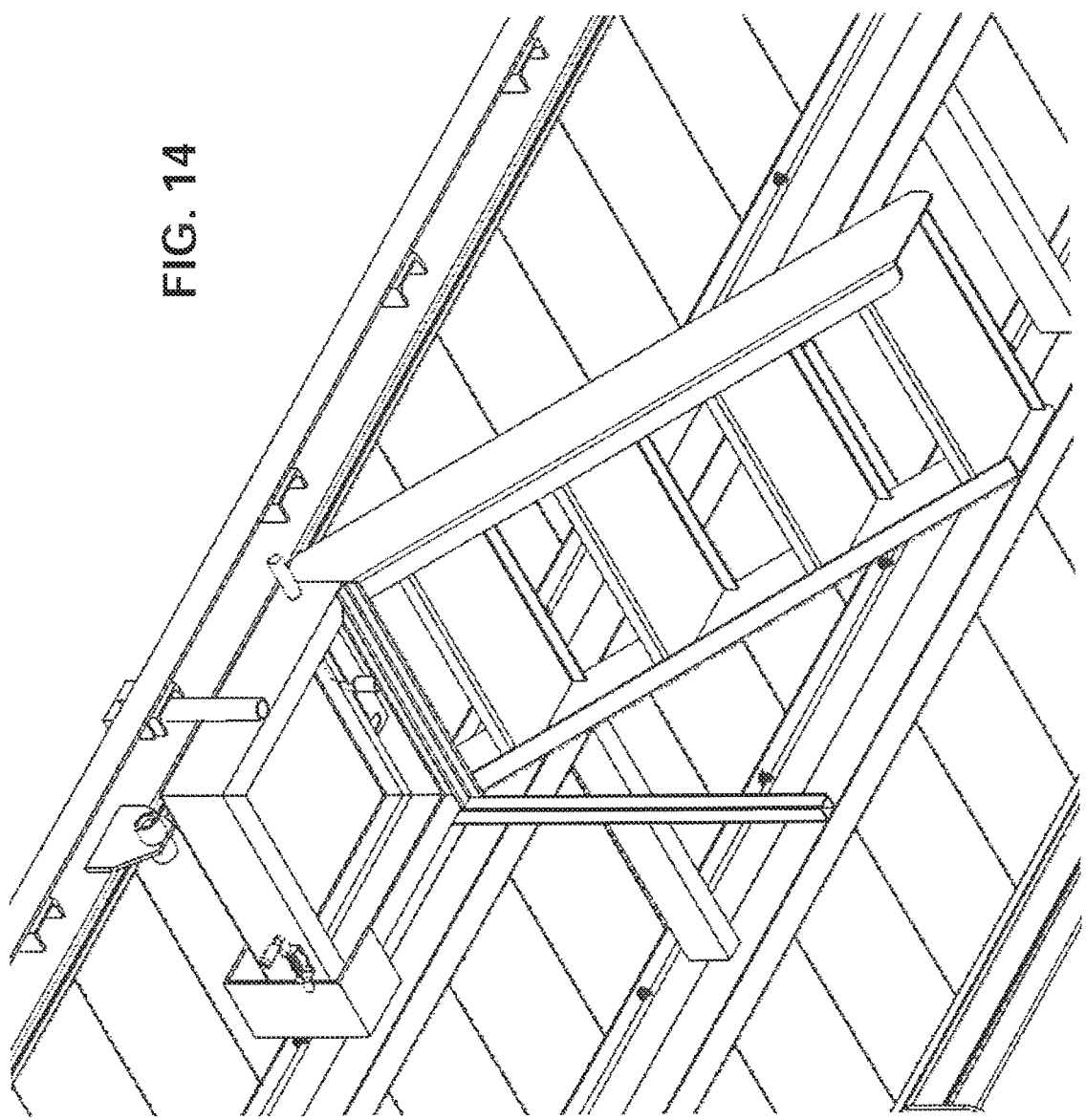
FIG. 14 is a perspective view of the assembled stair structure and trailer bed, from a vantage point below the stairs, with the stair structure shown in the storage position.

Alternatively, instead of the socket 28, a first square C-shaped clamping member (similar to that shown at 48) may be used below the bed 250, to nestingly receive and support an edge portion of the platform in the deployed position, and a second square C-shaped clamping member 48 (FIG. 7) may be used to nestingly receive and support an edge portion 29 of the platform in the storage position, to cooperate with the connector assembly 24 in supporting the weight of the stair structure 20.

The ladder section 23 includes a pair of spaced apart side supports, which may take the form of support plates 32, 34, and these side supports extend downwardly from the platform at an angle. The side support plates 32, 34 may be attached to a lower edge of the platform, or may be attached to a side edge of the platform, as shown in FIGS. 1-3.

The side support plates 32, 34 include lower end portions, respectively, which may be elevated above ground level by a specified amount such as, for example, 8-12 inches when installed on the trailer bed, in order to avoid contact with a road surface when in the stair structure 20 is in the storage position with the vehicle in motion.

Alternatively, the ladder section 23, including the side supports 32, 34 and step members 36, 38, 40 and 42, may be pivotally attached to the platform 25, to permit folding of the ladder section 23 below the platform in the storage position of the stair structure 20. Where so used, the ladder section 23 is capable of being moved to a storage position with portions of the side supports 32, 34 and step members 36, 38, 40 and 42 disposed below the platform.

In the embodiment of FIGS. 1-3, a plurality of spaced-apart step members, such as those shown at 36, 38, 40 and 42 extend between and are affixed to the side support plates 32, 34, and these step members are oriented substantially parallel to one another, as shown. In the depicted embodiment, the step members 36, 38, 40 and 42 are horizontal plate members.

Optionally, in different embodiment of the invention, the side supports may be made as telescopic tubes (not shown), each of which has one end of a step or rung attached, where the tubes may be either fully extended in a deployed configuration, or may be collapsed into a smaller stowed configuration.

The connector assembly 24 is configured and arranged such that when the stair structure 20 is attached to the bed, it can be rotated about the pivot pin 22, between a stowed, or stored position below the bed (shown in FIG. 2) and a deployed position which extends outwardly from an edge of the bed, as shown in FIG. 1.

Figure 4A:
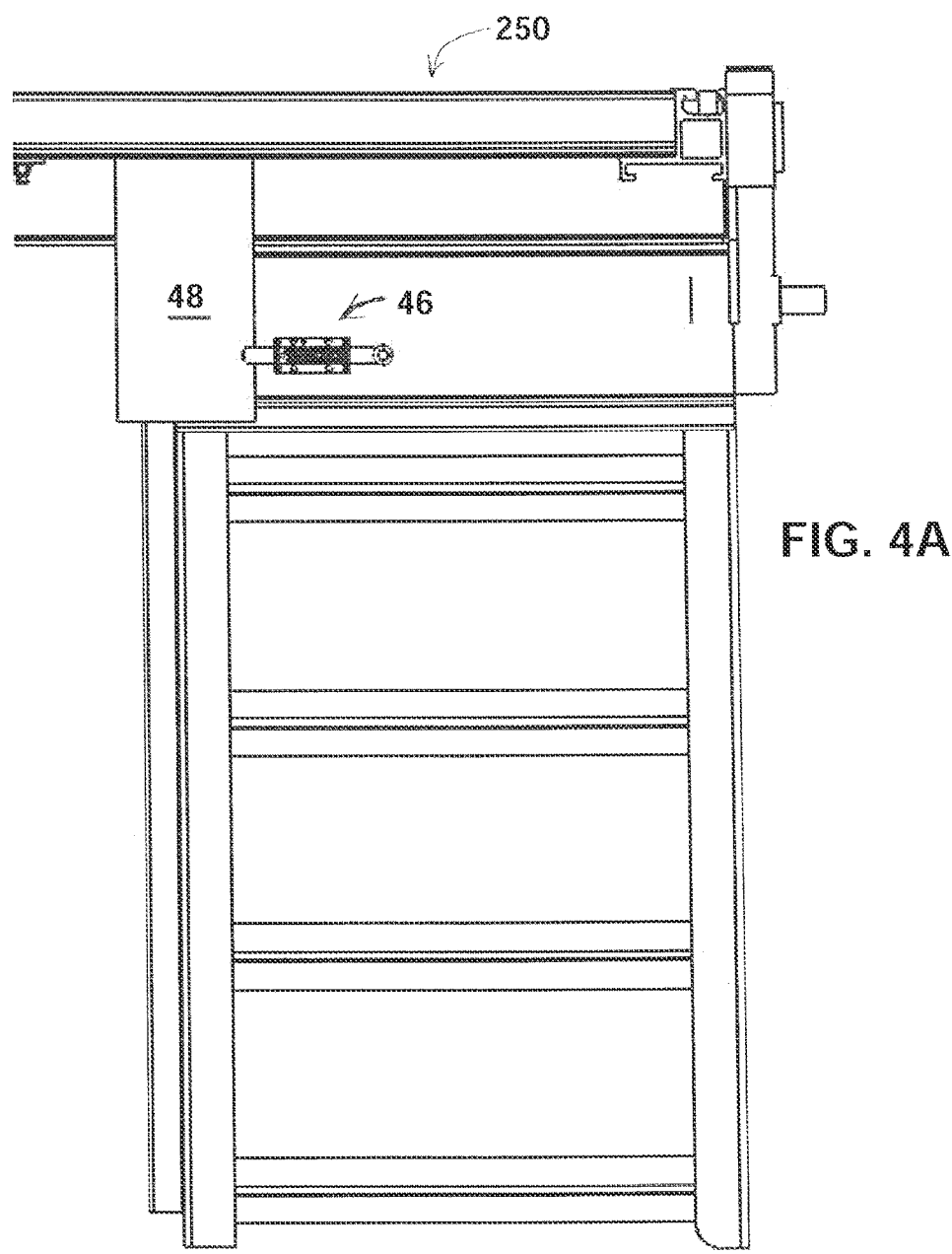
FIG. 4A is a first end plan view of the stair structure shown attached to the trailer bed in the storage position.
Figure 5:
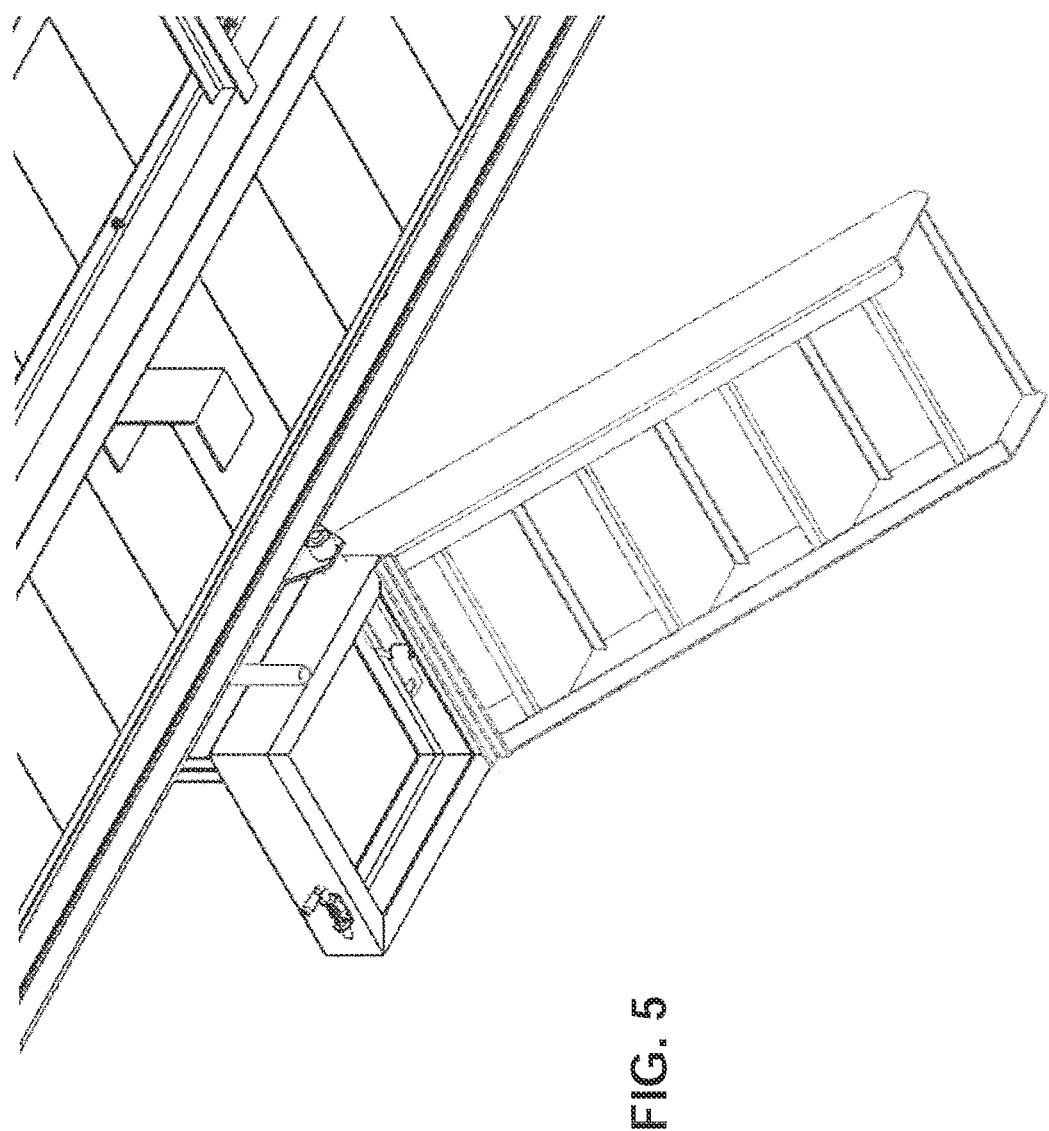
FIG. 5 is a perspective view of the assembled stair structure and trailer bed, from a vantage point below the stairs, with the stair structure shown in the deployed position.
Figure 6:
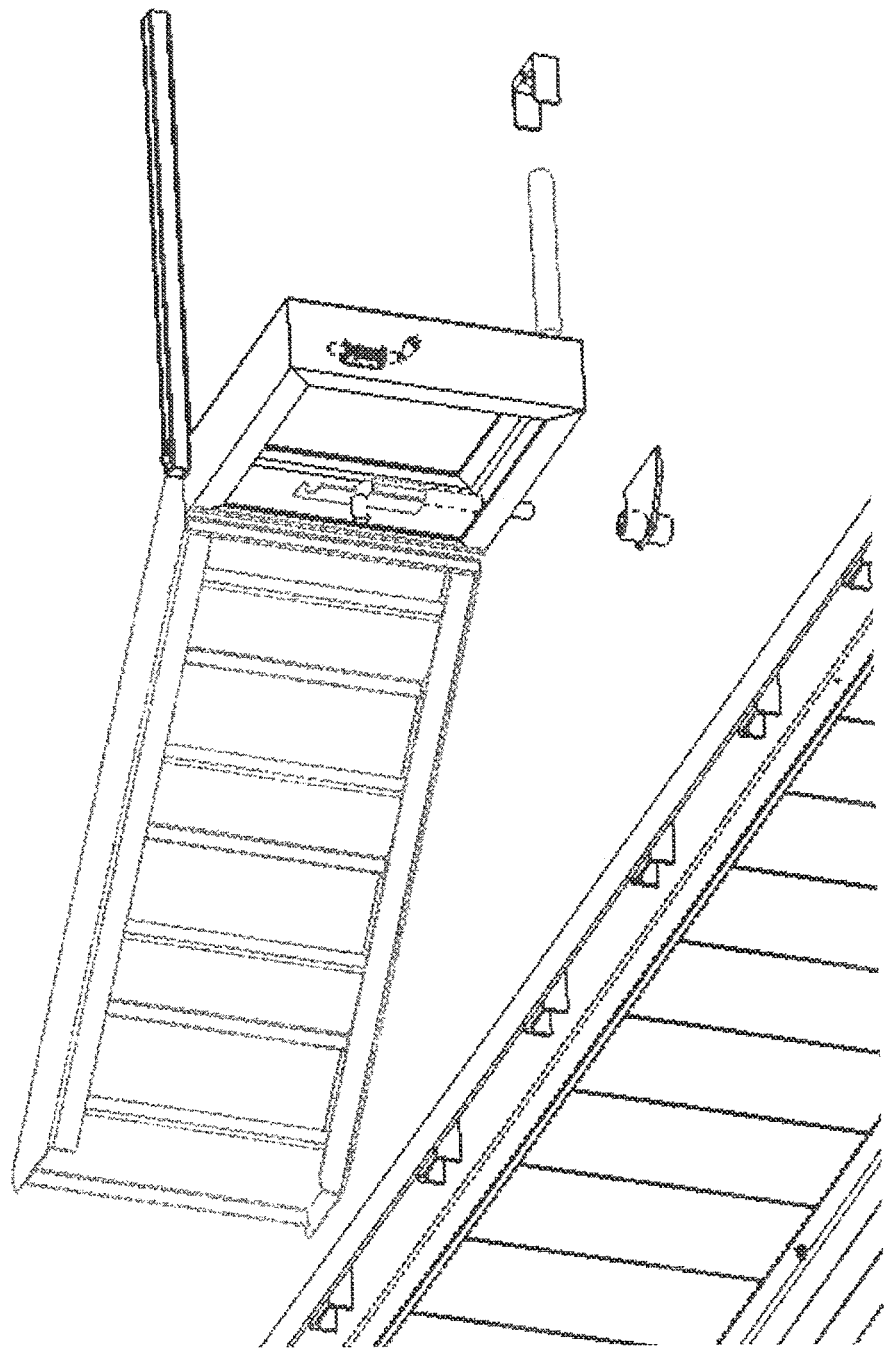
FIG. 6 is an exploded perspective view of the stair structure, associated hardware, and trailer bed from a vantage point below the stairs, with the stair structure shown in the deployed position.

Referring now to FIG. 4A, a latch assembly 46 may also be provided for temporarily locking a position of the stair structure 20 in relation to the bed 250, either in the storage position or in the deployed position. A square C-shaped support bracket 48 (FIGS. 5, 7) may be provided to be affixed to the lower surface of the bed 250, for supportively receiving an edge portion of the platform 25 therein in the storage position of the stair structure.

Kit

Another embodiment of the invention provides a kit of components capable of being assembled to form a stair structure 20 for attaching to an underside of a vehicle or trailer bed.

The kit 100 includes most of the components discussed above in connection with the first embodiment, provided in an unassembled arrangement and separate from a vehicle bed 250.

A kit 100 according to the present invention includes an upper platform, such as that shown at 25, and a connector assembly 24, which includes a pivot pin 22 and associated mounting hardware, possibly including a bracket 26 for attaching the pivot pin to a pocket 254 located at an edge of a truck or trailer bed 250.

The connector assembly 24 is configured and arranged such that when the stair structure 20 is assembled, using the components of the kit 100, and attached to the bed 250, the stair structure 20 can be pivotally moved about the pivot pin 22, which extends along a substantially vertical axis, between a stored position below the bed and a deployed position which extends outwardly from an edge of the bed.

The kit 100 also includes a ladder subassembly 23, including a pair of spaced apart side supports 32, 34 for attaching to the platform 25, and a plurality of spaced-apart step members such as those shown at 36, 38, 40 and 42 extending between the side supports and oriented substantially parallel to one another.

The kit 100 also includes a latch assembly 46 for temporarily locking a position of the stair structure 20 in relation to the bed 250, either in the storage position or in the deployed position, when the kit has been installed on the bed 250.

Figure 4B:
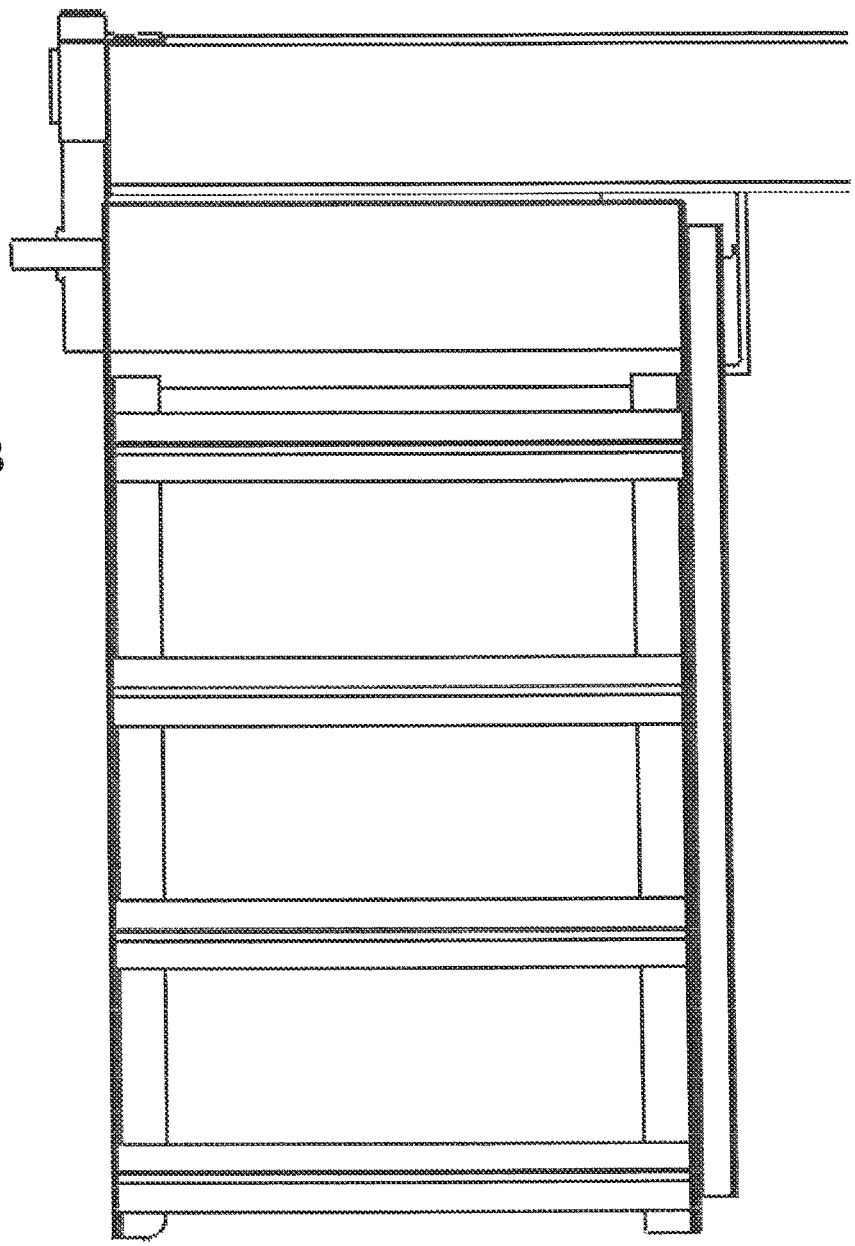
FIG. 4B is a second end plan view of the stair structure shown attached to the trailer bed in the storage position.

A square C-shaped support bracket 48 (FIGS. 4, 7) may be provided in the kit to be affixed to the lower surface of the bed 250, for supportively receiving an edge portion of the platform 25 therein in the storage position of the stair structure.

Method of Use

The present invention also relates to a method of using the stair structure 20 hereof.

The method includes a first step of unlatching the stair structure from a storage position below a vehicle or trailer bed by moving a latch member 46.

The method includes a second step of pivotally moving the stair structure out from below the trailer bed, and placing the stair structure into the deployed position thereof.

The method includes a third, optional step of climbing up the stairs 36, 38, 40 and 42 to the platform 25, and on to the trailer bed.

The method includes a fourth, optional step of descending the stairs, a fifth step of pivotally moving the stair structure into the storage position, and a final step of moving the latch member to temporarily lock the stair structure in the storage position.

Second Embodiment

Referring now to FIGS. 15-18, a stowable stair structure according to a second embodiment of the present invention is shown generally at 120. The stair structure 120 is provided for attaching to an underside of a bed 250 or other structural component of a vehicle or trailer. In FIGS. 15-18, a portion of the bed 250 is omitted from the drawing for illustrative purposes.

It should be understood that, while the stair structure 120 is configured and arranged to be installable on, and used with a vehicle or trailer bed 250, the bed 250 is conventional, and does not form part of the present invention, per se. If desired, the stair structure 20 can be configured to be attached to other suitable areas of a vehicle or trailer.

Figure 15:
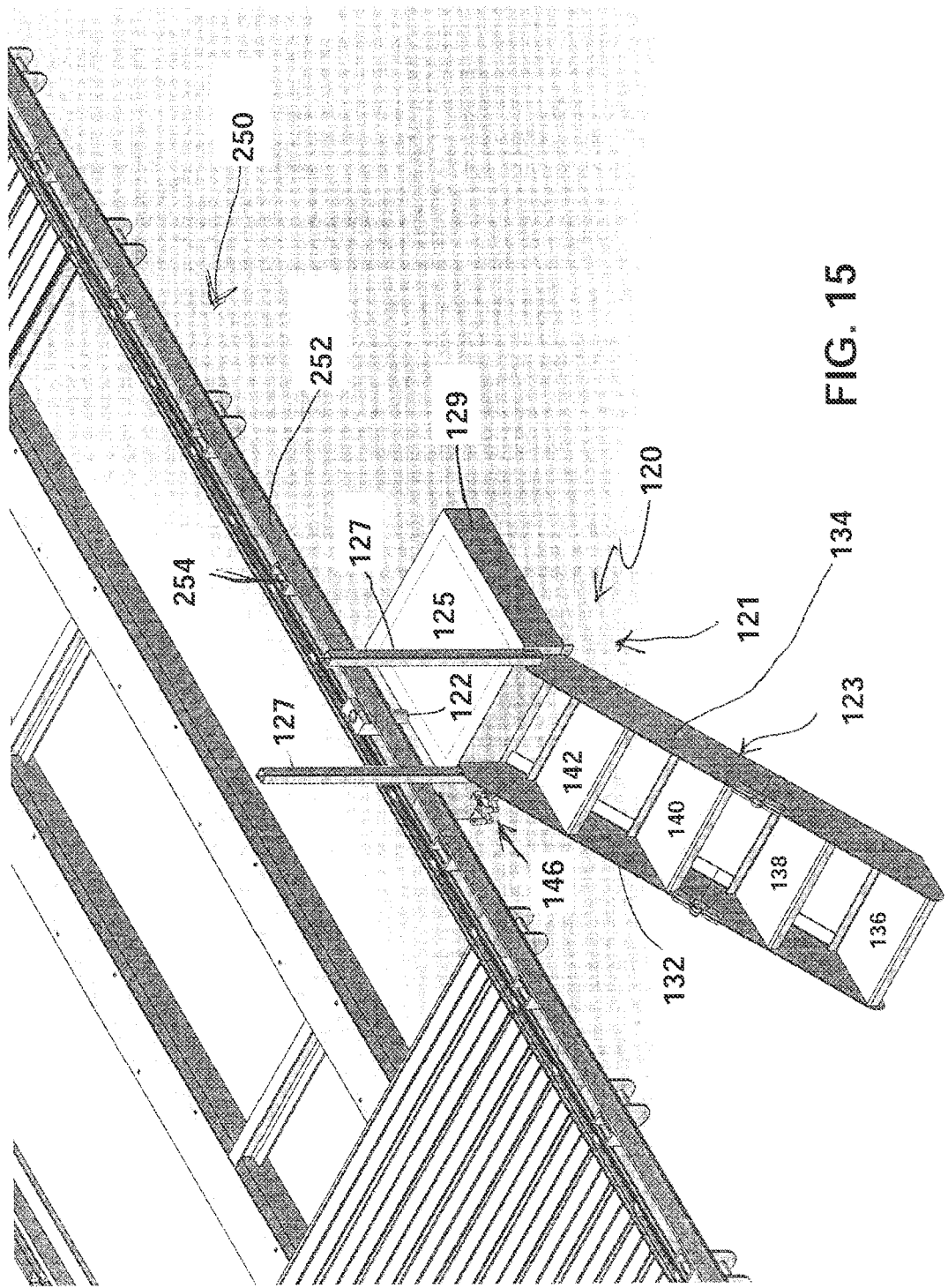
FIG. 15 is a first perspective view of a stair structure according to a second illustrative embodiment of the present invention, shown attached to a bed of a trailer and in a deployed position thereof, with portions of the trailer omitted for purposes of illustration.
Figure 17:
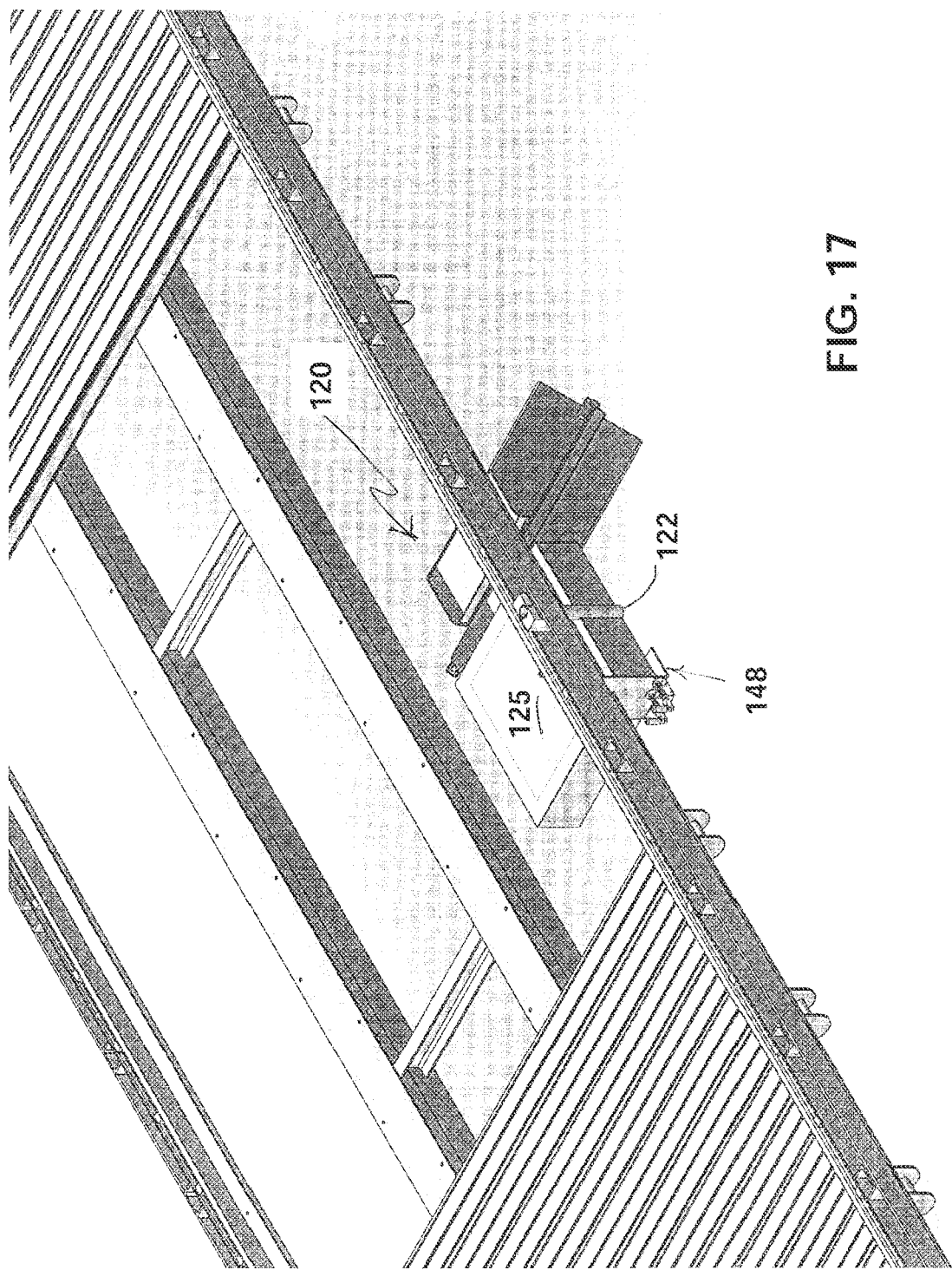
FIG. 17 is a third perspective view of the stair structure according to the second embodiment of the present invention, shown attached to the trailer bed and in a folded and storage position thereof.

When installed on the bed 250, the stair structure 120 is pivotally movable about a vertically oriented pivot pin 122, between a deployed position shown in FIG. 15 and a folded and storage position shown in FIG. 17. In the storage position, the stair structure 120 is disposed under the bed 250, and in the deployed position, the stair structure extends outwardly and downwardly from an edge portion 252 of the bed.

Although the deployed stair structure 120 is shown in FIG. 15 extending in a direction substantially parallel to an edge portion 252 of the bed 250 in the deployed position, it should be understood that the stair structure may be appropriately modified to make it extend in a direction substantially perpendicular to the edge portion of the bed in the deployed position, if desired.

The stair structure 120 is configured to be attached to the edge portion 252 of the trailer bed 250 by a connector assembly 124, which includes the pivot pin 122 and associated mounting hardware, which may include a bracket, similar to that shown at 26 (FIG. 3), for attaching the pivot pin to a pocket 254 located at the edge of the bed 250. Such pockets are relatively well known, and are commonly provided on truck and trailer beds.

Alternatively, and as previously noted, the stair structure 120 may be configured to be attached to a different part of the vehicle or trailer, as needed.

The stair structure 120 includes a main stair body 121 which is attached to the bed 250 by the connector assembly 124. The main stair body 121 includes a ladder section 123 and an upper platform 125, which may be pivotally connected together.

As noted above, the pivot pin 122 extends along a substantially vertical axis in an installed configuration of the stair structure 120. The pivot pin 122 may be welded on to, or otherwise fixedly attached to an upper surface of the platform 125.

Alternatively, the pivot pin 122 may extend through a vertical hole formed in the platform 125, and the pivot pin may be configured to be fixed in place while the stair structure pivots around the pivot pin. Optionally, the pivot pin 122 may include a widened portion (not shown) at the lower end thereof, to better support the main stair body 121.

Figure 16:
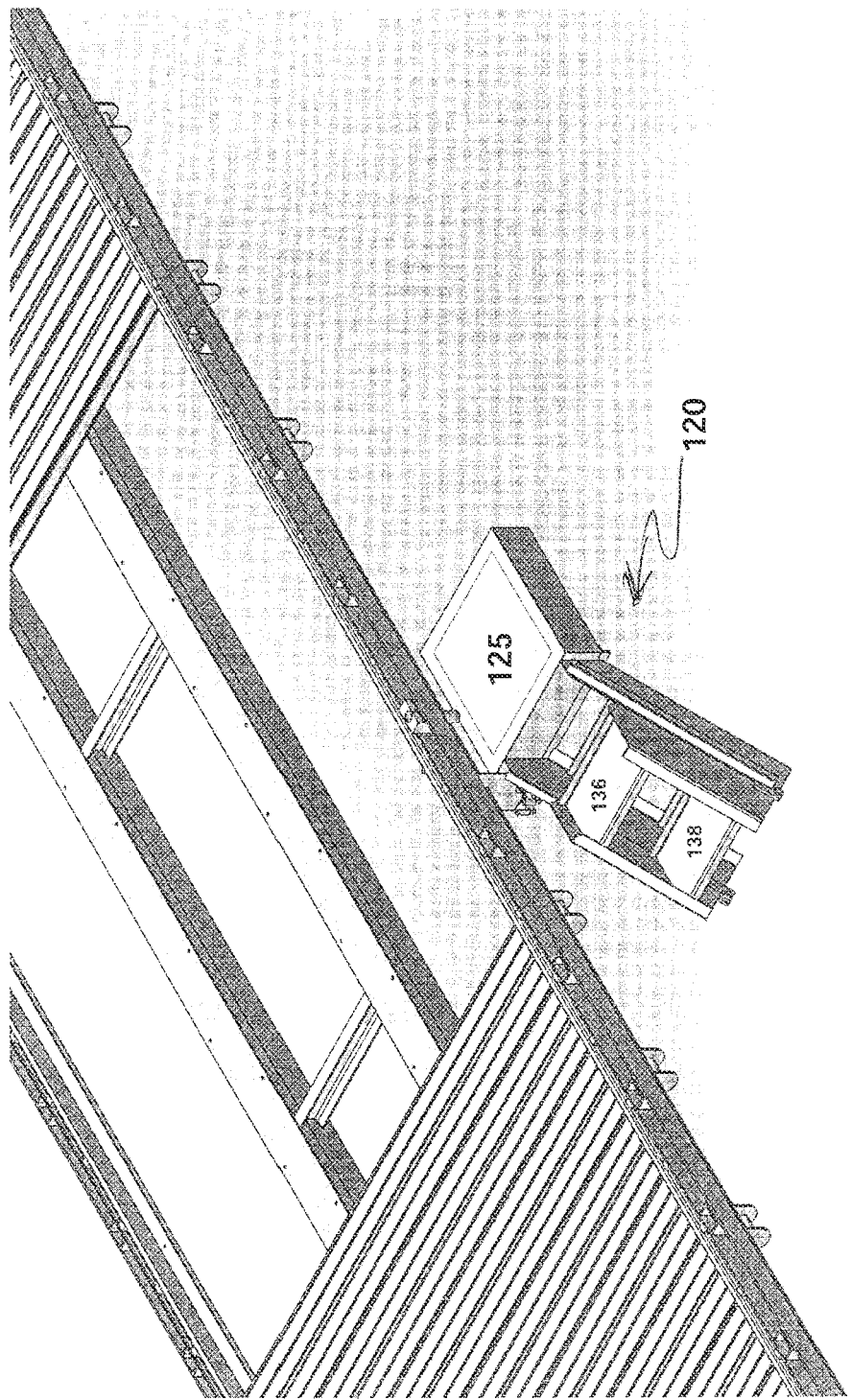
FIG. 16 is a second perspective view of the stair structure according to the second embodiment of the present invention, similar to FIG. 15 but with a ladder portion of the stair structure in a folded configuration.

The platform 125 may have one or more handle or post 127 attached thereto to permit grasping by a user while climbing the stair structure 120. A post such as that shown at 127 may be used on each of the left and right sides of the platform 125, as shown. Optionally, either or both of such posts 127 may support a collapsible handrail (not shown). Where used, the posts 127 are pivotally attached to side edge portions of the platform 125, or to an upper portion of the ladder section 123, to allow movement of the posts out of the way in preparation for pivotally moving the folded stair structure 120 from the deployed position to the storage position. The collapsed and storage position of the posts 127 is shown in FIG. 16.

A socket member may also be provided as part of the stair structure 120, and this socket member is similar to the socket member 28 shown in FIG. 3 and described herein in connection with the first embodiment.

Alternatively, instead of the socket member, a first square C-shaped clamping member (not shown) may be used below the bed 250 to nestingly receive and support an edge portion of the platform in the deployed position, and a second square C-shaped clamping member 148 (FIG. 17) may be used to nestingly receive and support an edge portion 129 of the platform in the storage position, to cooperate with the connector assembly in supporting the weight of the stair structure.

The ladder section 123 includes a pair of spaced apart side supports, which may take the form of support plates 132, 134 which are attached to the platform 125, and these side supports extend downwardly from the platform at an angle. In this second embodiment, each of the support plates 132, 134 is made in two separate segments which are pivotally attached to one another to permit the lower half of the ladder section to be folded upwardly until it contacts the upper half, in the folded configuration shown in FIG. 16. The side support plates 132, 134 may be attached to a lower edge of the platform 125, or may be attached to a side edge of the platform, as shown in FIGS. 15-16.

Alternatively, the ladder section 123, including the side supports 132, 134 and step members 136, 138, 140 and 142, may be pivotally attached to the platform 125, to permit folding of the ladder section 123 below the platform in the storage position of the stair structure 120. Where so used, the ladder section 123 is capable of being moved to a storage position, as shown in FIG. 17, with the side supports 132, 134 and step members 136, 138, 140 and 142 disposed below the trailer bed 250.

Optionally, in different embodiment of the invention, the side supports may be made as telescopic tubes (not shown), each of which has one end of a step or rung attached, where the tubes may be either fully extended in a deployed configuration, or may be collapsed into a smaller stowed configuration.

In the embodiment of FIG. 15, a plurality of spaced-apart step members, such as those shown at 136, 138, 140 and 142 extend between and are affixed to the side support plates 132, 134, and these step members are oriented substantially parallel to one another, as shown.

In the depicted embodiment, the step members 136, 138, 140 and 142 are horizontal plate members.

The connector assembly 124 is configured and arranged such that when the stair structure 120 is attached to the bed 250, it can be rotated about the pivot pin 122, between a stowed, or stored position below the bed (shown in FIG. 17) and a deployed position which extends outwardly from an edge of the bed, as shown in FIG. 15.

A latch assembly 146 may also be provided for temporarily locking a position of the stair structure 120 in relation to the bed 250, either in the storage position or in the deployed position. A square C-shaped support bracket 148 (FIG. 17) may be provided to be affixed to the lower surface of the bed 250, for supportively receiving an edge portion of the platform 125 therein in the storage position of the stair structure 120.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

Having, thus, described the invention, what is claimed is:

1. A personal elevation device for attaching to a transportable substrate which is a vehicle or trailer bed, said personal elevation device comprising:
   a platform assembly including a platform and a platform support member supporting the platform thereon,
   a connector assembly for operatively connecting the platform assembly to a portion of the transportable substrate, the connector assembly comprising a pivot pin which is configured to be fixed to the portion of the transportable substrate in a substantially vertically extending orientation and a mounting structure; wherein
   the connector assembly is configured and arranged such that when the personal elevation device is attached to the transportable substrate, the personal elevation device can be pivotally moved about the pivot pin between a storage position beneath the transportable substrate and an operative position extending outwardly of the transportable substrate,
   the platform is configured to extend substantially parallel to the portion of the transportable substrate to which it attaches in the storage and operative positions of the personal elevation device, and
   the platform support member includes a stair structure that is movably attached to the platform such that the stair structure is selectively rotatably relative to the platform between an extended position in which the stair structure extends diagonally downward from the platform in the operative position of the personal elevation device and a compact position in which the stair structure folds parallel and adjacent to the platform in the storage position of the personal elevation device.

2. The personal elevation device of claim 1, further comprising a latch assembly for temporarily fixing the personal elevation device in the operative position thereof.

3. The personal elevation device of claim 1, further comprising a post which is attached to a side of the platform assembly to permit grasping by a user, wherein the post is pivotally attached to the platform so that it may be selectively moved to an operative orientation thereof extending upward from the platform and a collapsed position thereof extending parallel adjacent to the platform.

4. The personal elevation device of claim 1, wherein the portion of the substrate is a pocket at an edge portion of the vehicle or trailer bed.

5. The personal elevation device of claim 1, wherein the stair structure comprises:
   a pair of spaced apart side supports operatively attached to an underside of the platform and extending downwardly therefrom at an angle in the first position of the stair structure;
   a plurality of spaced-apart step members extending between the side supports and oriented substantially parallel to one another.

6. The personal elevation device of claim 1, wherein the stair structure includes multiple sections which are pivotally connected to each other such that the sections may be selectively moved to an operative position thereof in which the sections extend in axial, parallel alignment with each other and a collapsed position thereof in parallel alignment adjacent to each other.

* * * * *